United States Patent
Alqahtani et al.

(10) Patent No.: US 12,448,579 B2
(45) Date of Patent: Oct. 21, 2025

(54) SYSTEM AND METHOD FOR CO2 EMISSION MONITORING AND PREDICTION

(71) Applicant: SAUDI ARABIAN OIL COMPANY, Dhahran (SA)

(72) Inventors: Abdulaziz M. Alqahtani, Dhahran (SA); Mohammad Abdullah Al-Ghufaili, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 372 days.

(21) Appl. No.: 18/176,382

(22) Filed: Feb. 28, 2023

(65) Prior Publication Data
US 2024/0287401 A1 Aug. 29, 2024

(51) Int. Cl.
*B01D 53/02* (2006.01)
*C10L 3/10* (2006.01)

(52) U.S. Cl.
CPC ........ *C10L 3/104* (2013.01); *C10L 2200/0286* (2013.01); *C10L 2200/0469* (2013.01); *C10L 2290/58* (2013.01); *C10L 2290/60* (2013.01)

(58) Field of Classification Search
CPC ............... B01D 53/1412; B01D 53/30; C10L 2200/0286; C10L 2200/0469; C10L 2290/10; C10L 2290/12; C10L 2290/541; C10L 2290/58; C10L 2290/60; C10L 3/104
See application file for complete search history.

(56) References Cited

U.S. PATENT DOCUMENTS

| | | | |
|---|---|---|---|
| 6,732,055 B2 | 5/2004 | Bagepalli et al. | |
| 7,421,348 B2 | 9/2008 | Swanson | |
| 8,620,633 B2 | 12/2013 | Swanson | |
| 8,647,596 B1 * | 2/2014 | Hyde | G06F 17/00 423/220 |
| 8,768,664 B2 | 7/2014 | Swanson | |
| 11,519,089 B1 * | 12/2022 | Faure | C25B 9/73 |
| 2012/0048111 A1 * | 3/2012 | Nakao | B01J 20/183 95/139 |
| 2019/0022580 A1 * | 1/2019 | Al Muhsen | B01D 53/1406 |
| 2019/0055125 A1 * | 2/2019 | Al-Qahtani | C01B 17/167 |
| 2023/0109192 A1 * | 4/2023 | Sugiyama | B01D 53/04 95/291 |
| 2023/0201760 A1 * | 6/2023 | Quek | B01D 53/22 423/220 |
| 2024/0042370 A1 * | 2/2024 | Juchymenko | B01D 53/1462 |

* cited by examiner

*Primary Examiner* — Christopher P Jones
(74) *Attorney, Agent, or Firm* — Osha Bergman Watanabe & Burton LLP

(57) ABSTRACT

Described is a method for monitoring and predicting $CO_2$ emissions at a gas processing plant. Quantitative data related to one or more characteristics of a gas stream of feed sources at the gas processing plant is continuously acquired. A correlation between the characteristics and a measured $CO_2$ emission for the gas processing plant is determined. Using a prediction regression model, an amount of total $CO_2$ being emitted by the gas processing plant is predicted based on the quantitative data.

16 Claims, 4 Drawing Sheets

SYSTEM AND METHOD FOR CO2 EMISSION MONITORING AND PREDICTION

BACKGROUND

Before a raw natural gas containing hydrogen sulfide ($H_2S$) or carbon dioxide ($CO_2$) can be used, the raw gas must be treated to remove impurities to acceptable levels, commonly by an amine treatment process. This is referred to as "sweetening". Gas processing plants produce $CO_2$ either through natural venting of acid gases associated with the received feed, or by combustion to produce steam and power to meet the demands of the gas processing plant.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for monitoring and predicting $CO_2$ emissions at a gas processing plant. For each feed source at the processing plant, a set of quantitative data related to one or more characteristics of a gas stream of the feed source is acquired. A correlation is determined between the one or more characteristics and a measured $CO_2$ emission for the gas processing plant. Using a prediction regression model, an amount of total $CO_2$ being emitted by the gas processing plant is predicted based on the set of quantitative data.

In another aspect, the one or more characteristics is at least one of a composition of the gas stream and a flow rate of the gas stream.

In another aspect, a recommendation for an operation to be performed by a gas treating solvent system is generated.

In another aspect, the operation performed reduces the amount of total $CO_2$ being emitted by the gas processing plant.

In another aspect, the operation is adjusting a circulation rate of solvent in the gas treating solvent system.

In another aspect, the gas treating solvent system is a N-methyl diethanolamine (MDEA) system.

In another aspect, the operation is automatically adjusting one or more circulation control valves of the gas treating solvent system.

In another aspect, the set of quantitative data is acquired via at least one sensor associated with each feed source.

In another aspect, the at least one sensor is a gas chromatograph (GC) analyzer.

In another aspect, the at least one sensor is a flow meter.

In another aspect, embodiments disclosed herein relate to a system for monitoring and predicting $CO_2$ emissions at a gas processing plant. The system comprises a feed and product surge unit configured for receiving a plurality of gas streams, each gas stream obtained from a feed source at the gas processing plant. The system further includes a gas treating solvent system configured for treating the plurality of gas streams and at least one sensor associated with each feed source. The at least one sensor is configured for acquiring a set of quantitative data related to one or more characteristics of its associated feed source. An optimization system is configured for analyzing the set of quantitative data and generating a recommendation for at least one operation to be performed by the gas treating solvent system based on the set of quantitative data. A control system is configured for causing the at least one operation to be performed by the gas treating solvent system, where the operation reduces an amount of total $CO_2$ emitted by the gas processing plant.

Other aspects and advantages of the claimed subject matter will be apparent from the following description and the appended claims.

DETAILED DESCRIPTION

In one aspect, embodiments disclosed herein relate to systems and methods for calculating the $CO_2$ emissions from several plant feed sources and predicting the plant $CO_2$ emissions based on the sources. In another aspect, embodiments disclosed herein relate to improving plant operations based on predicted $CO_2$ emissions.

Figure 1:
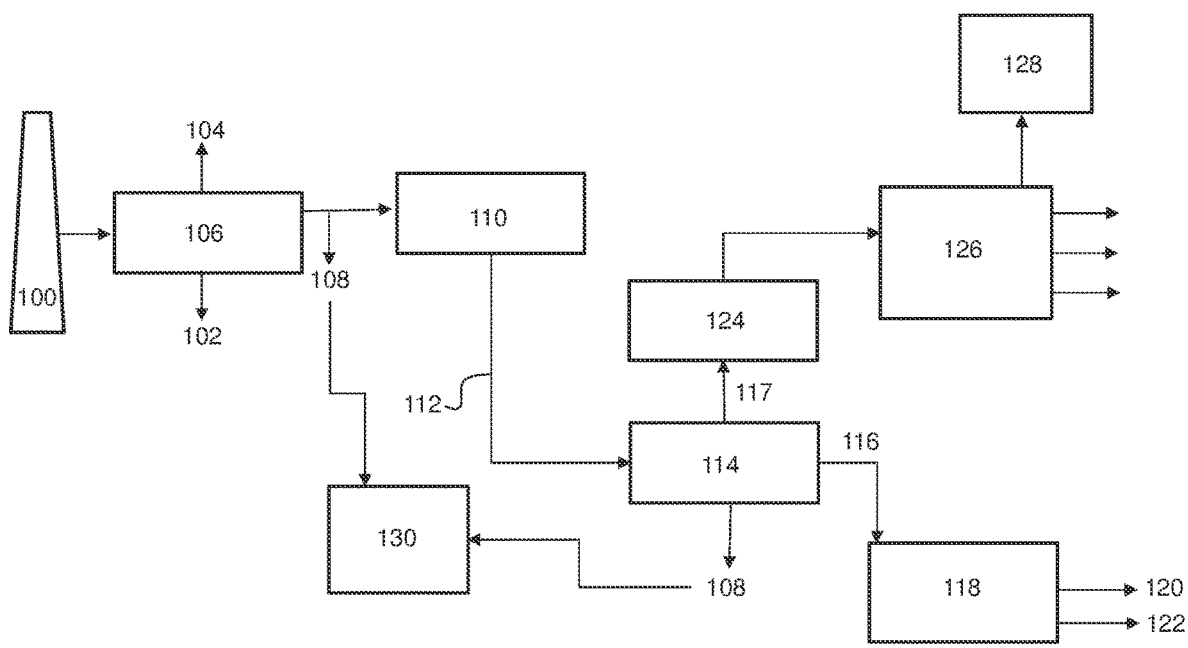
FIG. 1 is an illustration of systems of a gas processing plant according to embodiments of the present disclosure.

FIG. 1 depicts systems of an exemplary gas processing plant used for processing of produced fluids from one or more production wells 100. Processing of oil and natural gas from a gas well 100 includes removal of oil 102 and water 104 in a separation system 106. The raw natural gas from the separation system may then be compressed and condensed to a smaller volume at a higher pressure in a compression system 110 and further processed in gas sweetening system 114, separation system 126, and sulfur recovery unit 118. Upsets in the overall process may require flaring of gas streams 108. Flaring refers to burning excess natural gas using a dedicated flare to ignite methane and other components in the gas, resulting in $CO_2$ emissions.

One or more sour gas streams 112 are treated in a gas sweetening system 114. Gas sweetening is the process of removing impurities 116, such as $H_2S$, $CO_2$, and mercaptans, from the natural gas. The impurities 116 are processed in a sulfur recovery unit 118, producing tail gas 120, venting $CO_2$ recovered from the sour gas stream 112 to the atmosphere, and liquid sulfur 122. Moisture is removed from the treated sweet gas 117 in a dehydration system 124 followed by extraction of different components of the gas in a fractionation system 126, such as propane, ethane, methane, and other condensable components of the natural gas. The fractionation system 126 also extracts dry natural gas 128, including methane, nitrogen, $CO_2$, and ethane.

Figure 1A:
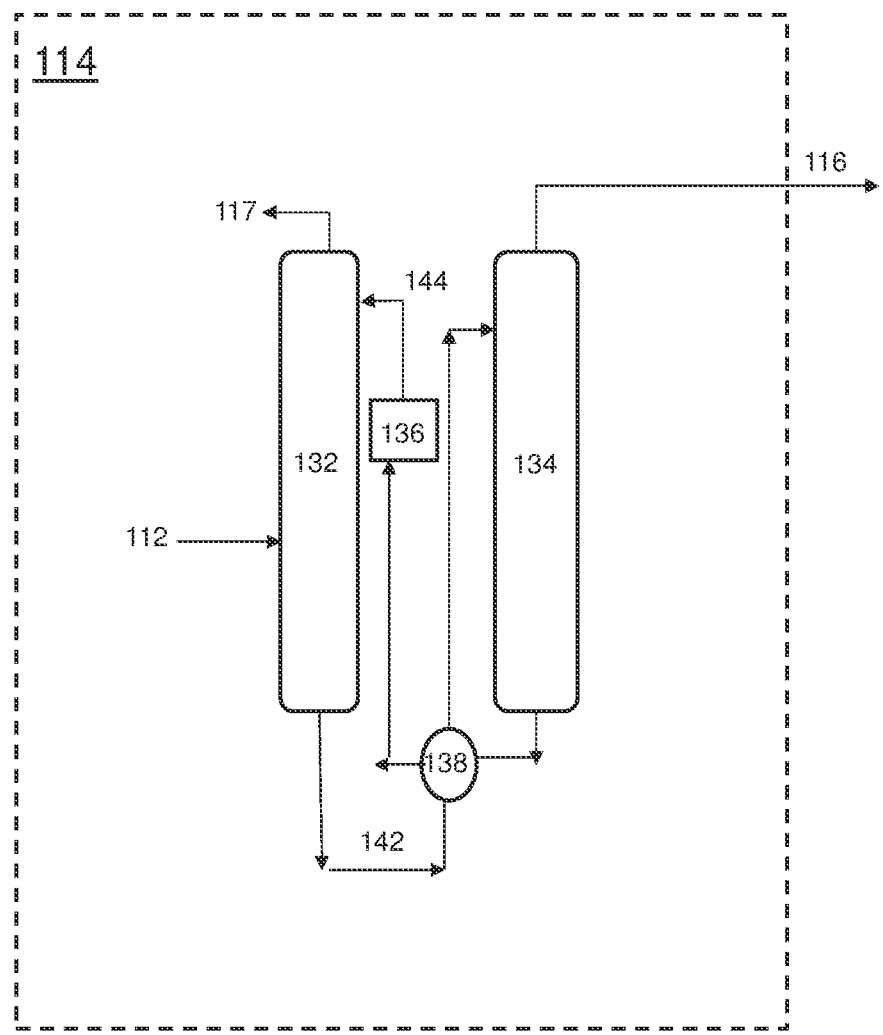
FIG. 1A is a flow diagram illustrating a gas sweetening system according to embodiments of the present disclosure.

The gas sweetening system 114 may be an amine-based sweetening system such that an amine solvent is used to treat the sour gases. Common amine solvents include N-methyl diethanolamine (MDEA), monoethanolamine (MEA), and diglycoamine (DGA). FIG. 1A depicts an exemplary gas sweetening system 114 which includes an absorber unit 132 and a regenerator unit 134. Accessory equipment includes a cooler 136 and a heat exchanger 138. In the absorber unit 132, an amine solution, containing an amine solvent, absorbs $H_2S$ and $CO_2$ from a sour gas stream 112 to produce a treated sweet gas 117 and an amine solution rich in the absorbed gases 142. The rich amine is sent through the heat exchanger 138 into the regenerator unit 134 to produce a lean amine solution 144. The lean amine solution 144 is recycled for reuse in the absorber unit 132. The acid gas stream from the regenerator unit 134 contains concentrated $H_2S$ and $CO_2$. Although not illustrated, the regenerator unit 134 may include a reboiler and an overhead condensation system.

A gas processing plant produces $CO_2$ by natural venting, flaring activities, and burning fuel to produce steam and power and to support the sulfur recovery unit 118. Starting with natural venting, an exemplary gas processing plant receives sour gas feeds from distinct sources, such as offshore fields. As described above, the received sour gas stream 112 is sweetened, and all of the associated acid gases are sent to the sulfur recovery unit 118 to be vented to the atmosphere through a thermal oxidizer stack (not shown).

For the flaring activities, an exemplary gas plant is equipped with a flare gas recovery unit (FGRU) 130 that receives flare gas streams 108 from the gas processing plant. The flare gases that exceed the FGRU capacity are flared. The flare gases are categorized as high-pressure flare gas, low pressure flare gas, or low temperature flare gas. Each flare gas stream has a respective source, composition, and flowrate.

Each of the produced fluids provided as a feed source to the gas processing plant contributes to $CO_2$ emissions, and embodiments herein categorize each source as contributing to $CO_2$ emissions through energy requirements for processing of the produced fluids from the well, flaring, or natural venting of $CO_2$ contained in the produced fluids following treatment. Additionally, each source has its own unique impurities and composition of the produced gases. For instance, one source may have a higher sulfur content, while another source may have a lower $CO_2$ content. Thus, each feed source contributes independently to the needed processing and the resultant $CO_2$ emissions (venting, flaring, and composition/fuel).

In one or more embodiments, at least one sensor, such as a gas chromatograph (GC) analyzer and/or a flow meter, associated with each feed source provides qualitative and quantitative data regarding the composition of the gas streams being provided to the natural gas processing facility. Each GC analyzer at the plant measures the $CO_2$ content in its source's respective gas stream. Flow meters at each source may be used to obtain the flow rates of the gas streams. The analysis of each gas stream may be performed remotely with the data related to the gas stream being transmitted to another location. Alternatively, the analysis may be performed near the well, such as on a flow line conducting gas from near the well or a gas/oil/water separation area to a natural gas processing area. Additionally, flow rates may be measured as the gas stream is received from the field when it enters the natural gas processing facility.

The system and method according to embodiments of the present disclosure utilizes predictive analytics to estimate the amount of $CO_2$ being emitted to the environment based on different gas streams, compositions, and flowrates. Additionally, the systems and methods described herein provides real-time monitoring of the plant total $CO_2$ emissions and predicts emissions with respect to one or more characteristics of a gas stream, such as a sour gas feed and its source.

Furthermore, in one or more embodiments, the system and method described herein generates real-time recommendations for operations performed by a gas sweetening system. The invention described herein may be used to instantaneously estimate and predict the required solvent circulation rate, based on the sour gas feed source and rate, to achieve a desired total $CO_2$ emissions for the gas processing plant.

Measured flow rates and compositional analyses of gas feeds provide data regarding a quantity of acid gases needing removal, thus providing information to adequately adjust the amount of solvent so that a large excess of absorbent is not used. Preventing excess absorbent results in the reduction of regeneration steam required as well as the energy required for circulation and other operations. For instance, the acid gas removal solvent (e.g., MDEA) circulation rate may be adjusted to reduce its associated energy consumption by reducing the associated steam used to regenerate the amine solution. In some embodiments, the MDEA circulation rate is the rate required to remove an amount of the $H_2S$ and an amount of the $CO_2$ from a gas feed. The circulation rate is a ratio based on the acidity of the received gas feed. Parameters that influence the MDEA circulation rate include gas flow rate, mol % of $H_2S$ to be removed, mol % of $CO_2$ to be removed, molar weight of MDEA, moles of acid gas/mole, and amine solution weight percent calculated.

Figure 1B:
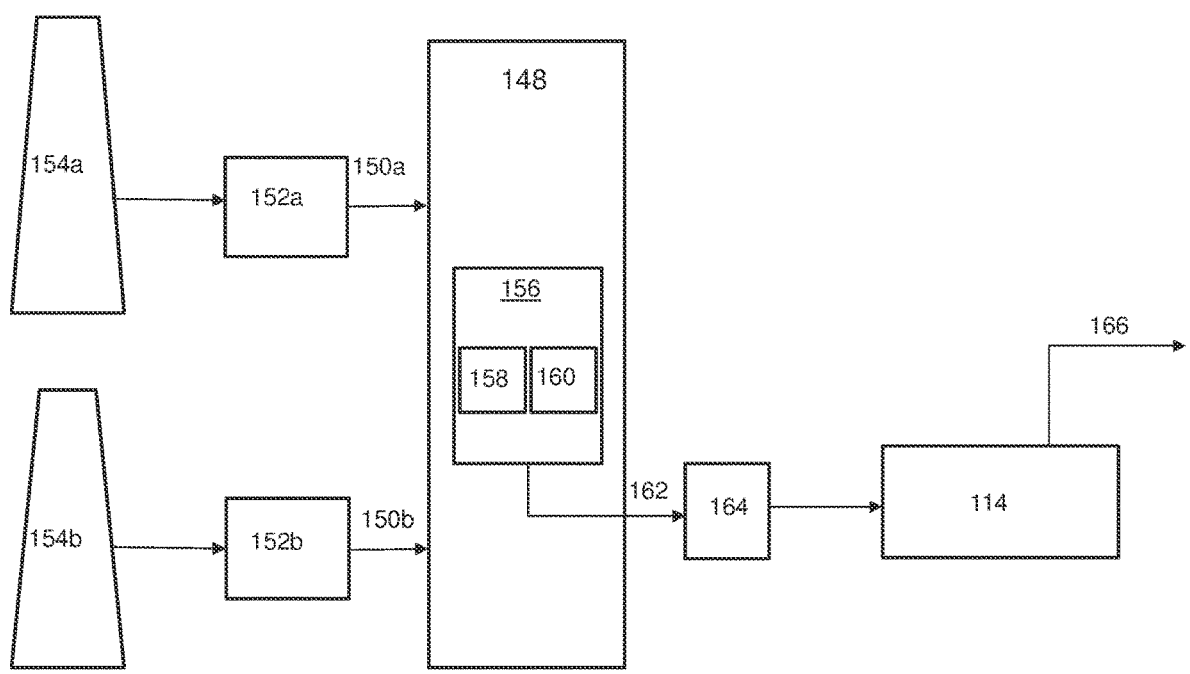
FIG. 1B is a flow diagram illustrating an optimization system according to embodiments of the present disclosure.

In some embodiments, an optimization system may be utilized to optimize the gas treating solvent system. In the embodiment shown in FIG. 1B, the optimization system 148 receives input data 150*a* and 150*b*, such as GC analyzer data and/or flow rate data, from one or more of analyzers 152*a* and 152*b*, such as a GC analyzer and/or a flow meter, associated with natural gas feed sources 154*a* and 154*b* (such as from the one or multiple production wells 100 (FIG. 1)). The input data 150*a* and 150*b* may be analyzed by a computer system 156 including at least one computer processor 158. Although illustrated as a single computer processor 158 in FIG. 1B, two or more processors may be used according to particular needs, desires, or particular implementations of the computer system 156. Generally, the computer processor 158 executes instructions and manipulates data to perform the operations of the computer system 156 and any algorithms, methods, functions, processes, flows, and procedures as described in the instant disclosure.

The computer system 156 also includes a non-transitory computer readable medium, or a memory 160, that holds data for the computer system 156 or other components (or a combination of both) that can be connected to a network. For example, memory 160 can be a database storing data consistent with this disclosure. Although illustrated as a single memory 160 in FIG. 1B, two or more memories may be used according to particular needs, desires, or particular implementations of the computer system 156 and the described functionality. While memory 160 is illustrated as an integral component of the computer system 156, in alternative implementations, memory 160 can be external to the computer system 156.

Following processing, analyzed data 162 may be transmitted to a control system 164. The control system 164, in turn, causes mechanical operations to be performed based on the analyzed data 162. For example, the control system 164 may act to automatically adjust circulation control valves of the gas sweetening system 114, thereby adjusting the solvent circulation rate based on the input data 150*a* and 150*b* received. By proactively controlling the solvent circulation rates based on feed source compositions and rates, overall $CO_2$ emissions, resulting from the energy requirements for circulating solvent, regenerating the solvent, and other operational needs of the sweetening process, may be reduced.

In other embodiments, the feed source compositions and rates may be used to proactively predict compositions and amounts of acid gas being provided to sulfur recovery, such that operations of the sulfur recovery unit may be optimized so as to further reduce overall plant $CO_2$ emissions. Further, the feed forward control system according to embodiments herein may provide for adjusting energy (electricity and steam) production variables, such as fuel feed rates to gas turbines or boilers, based on the expected energy demands for processing of the feed. Thus, using the measured compositions and rates of the sources, embodiments herein may further contribute to controlling and reducing the overall $CO_2$ emissions resulting from energy production. For instance, given the composition of sour gas, the estimated $CO_2$ in the acid gas, and an amount of enrichment gas, the circulation rate of MDEA may be optimized in terms of steam consumption in the gas sweetening system (or other acid gas removal (AGR) unit).

As an exemplary embodiment of reducing emissions according to embodiments herein, a prediction regression model was developed to estimate the amount of $CO_2$ being emitted to the environment based on each of the multiple raw natural gas feed streams. In this embodiment, a natural gas processing plant receives a sour natural gas stream from each of three sources. Based on the feed compositions and rates for each source, the model may calculate the estimated emissions associated with various processing units, including the sulfur recovery unit thermal oxidizer, sulfur recovery unit reaction furnace, boilers, combustion gas turbines used in energy generation, and flaring requirements (collectively "nodes" herein). Each of the calculations associated with each node provides an estimate of the $CO_2$ being emitted during the processing of the natural gas and sulfur recovery. The overall contribution of emissions attributed to each source and node may then be used to (i) calculate the amount of vented $CO_2$ based on the respective sour gas sources, and (ii) provide recommended adjustments to operational variables to both (a) meet product compositional requirements while (b) reducing or minimizing $CO_2$ emissions associated with one or more nodes. For example, as mentioned above, the solvent circulation and regeneration requirements may be automatically adjusted by the control system, based on the feed source compositions and rates, to improve (reduce) or optimize (minimize) $CO_2$ emissions while meeting product requirements.

Tables 1 and 2 provide exemplary values of a prediction regression model according to embodiments of the present disclosure. $a, $a2, and $a3 represent the $CO_2$ content in the blends of sour gas feeds entering the gas processing plant. The values in Table 1 represent the correlation between the $CO_2$ content in the feed and the total $CO_2$ emissions across the gas processing plant. In the regression model, the dependent variable is the total plant $CO_2$ emissions and the independent variable is the $CO_2$ content in a source, such as the feed to the gas sweetening system.

TABLE 1

| Name | Coefficient | Standard Error | P-Value |
| --- | --- | --- | --- |
| $a | 1147818.974198888 | 1657.8514589639276 | 0 |
| $a2 | −333205.9075716559 | 479.4138929056392 | 0 |
| $a3 | 24226.920205625695 | 34.65851139932958 | 0 |

TABLE 2

| Name | Value |
| --- | --- |
| Intercept | 0 |
| Intercept Standard Error | 0 |

TABLE 2-continued

| Name | Value |
| --- | --- |
| Adjusted R Squared | 0.99467070824 |
| R Squared | 0.9946707100834437 |
| Regression Sum Squares | 2112644463898309.8 |
| Suggested P Value Cutoff | 0.001 |

In one or more embodiments, a feed and product surge unit may receive multiple sour gas feeds from different sources, as described in detail above. In addition to receiving the sour gas feeds, the feed and product surge unit may control the flow to downstream gas processing units. The combined feeds may be processed by the gas sweetening system 114, as described above. Waste gas is fed to the FGRU 130. Flare gas that exceeds the capacity of the FGRU 130 is flared. The gas that is diverted in the FGRU 130 is directed to the sulfur recovery unit 118. Flash gas may be an additional product of the gas sweetening system 114. As described above, the sulfur recovery unit 118 vents emissions (e.g., $CO_2$, $H_2O$, $H_2S$, $SO_2$) from the gas processing plant. Any flare gases produced in the sulfur recovery unit 118 may be captured by the FGRU 130. An enrichment gas, such as oxygen, produced by the gas sweetening system 114 is fed to the sulfur recovery unit 118.

Methane, or other fuel gas, from the gas sweetening system 114 may be combusted in a utilities and cogeneration unit to generate electricity, steam, or both that is used within the gas processing plant. Thus, the utilities and cogeneration unit is another source of emissions in the gas processing plant. Following treatment (i.e., sweetening) of the gas, the natural gas may be further processed, such as in the fractionation system 126. Various equipment in the fractionation system 126 may be connected to the FGRU 130. Thus, during upsets or normal operations, the fractionation system 126 may contribute vent gases for processing in the FGRU 130.

Figure 2:
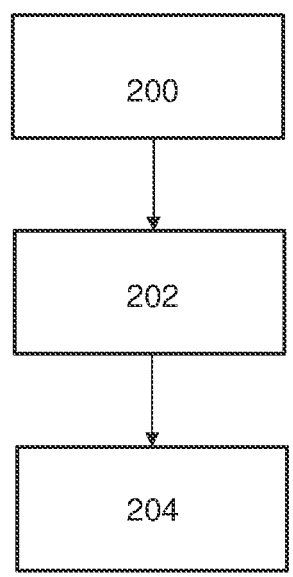
FIG. 2 is a flow diagram illustrating a method for monitoring and predicting $CO_2$ emissions at a gas processing plant according to embodiments of the present disclosure.

FIG. 2 is a flow diagram illustrating a method for monitoring and predicting CO2 emissions at a gas processing plant according to embodiments of the present disclosure. In step 200, a set of quantitative data related to at least one characteristic of a gas stream of a source is continuously acquired. Non-limiting examples of characteristics include acidity, flow rate, and $CO_2$ content. In step 202, a correlation between the characteristic and a $CO_2$ emissions total for the gas processing plant is determined. In step 204, an amount of $CO_2$ being emitted by the gas processing plant is predicted using the prediction regression model based on a current set of quantitative data.

The systems and methods according to embodiments of the present disclosure provide a cost-effective alternative to conventional analyzers for measuring $CO_2$ emissions at a natural gas processing facility, reducing both capital and operational expenses typically associated with real-time monitoring of the numerous output streams of a gas processing plant to determine emissions. Embodiments herein also provide for real-time monitoring of multiple sources, such as offshore fields, to advantageously control operations at the gas processing plant, thereby reducing overall $CO_2$ emissions associated with processing of the natural gas.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures.

What is claimed:

1. A method for monitoring and predicting $CO_2$ emissions at a gas processing plant, comprising:
   continuously acquiring a set of quantitative data related to one or more characteristics of a gas stream of each of a plurality of feed sources at the gas processing plant;
   determining a correlation between the one or more characteristics and a measured $CO_2$ emission for the gas processing plant;
   using a prediction regression model, predicting an amount of total $CO_2$ being emitted by the gas processing plant based on the set of quantitative data; and
   based on the predicted amount of total $CO_2$, adjusting a circulation rate of solvent in a gas treating solvent system.

2. The method of claim 1, wherein the one or more characteristics is at least one of a composition of the gas stream and a flow rate of the gas stream.

3. The method of claim 1, further comprising generating a recommendation for at least one operation to be performed by the gas treating solvent system.

4. The method of claim 3, further comprising performing the at least one operation, wherein the at least one operation reduces the amount of total $CO_2$ being emitted by the gas processing plant.

5. The method of claim 1, wherein the gas treating solvent system is a N-methyl diethanolamine (MDEA) system.

6. The method of claim 3, wherein the at least one operation is automatically adjusting one or more circulation control valves of the gas treating solvent system.

7. The method of claim 1, wherein the set of quantitative data is acquired via at least one sensor associated with each feed source.

8. The method of claim 7, wherein the at least one sensor is a gas chromatograph (GC) analyzer.

9. The method of claim 7, wherein the at least one sensor is a flow meter.

10. A system for monitoring and predicting $CO_2$ emissions at a gas processing plant, comprising:
    a feed and product surge unit configured for receiving a plurality of gas streams, each gas stream obtained from a feed source at the gas processing plant;
    a gas treating solvent system configured for treating the plurality of gas streams;
    at least one sensor associated with each feed source;
    wherein the at least one sensor is configured for acquiring a set of quantitative data related to one or more characteristics of its associated feed source;
    an optimization system configured for analyzing the set of quantitative data and generating a recommendation for at least one operation to be performed by the gas treating solvent system based on the set of quantitative data; and
    a control system configured for causing the at least one operation to be performed by the gas treating solvent system based on the recommendation,
    wherein the at least one operation comprises automatically adjusting one or more circulation control valves of the gas treating solvent system, and
    wherein adjusting the one or more circulation control valves reduces an amount of total $CO_2$ emitted by the gas processing plant.

11. The system of claim 10, wherein the at least one sensor is a gas chromatograph (GC) analyzer.

12. The system of claim 10, wherein the at least one sensor is a flow meter.

13. The system of claim 10, wherein adjusting the one or more circulation control valves adjusts a circulation rate of solvent in the gas treating solvent system.

14. The system of claim 10, wherein the gas treating solvent system is a N-methyl diethanolamine (MDEA) system.

15. The system of claim 10, wherein the at least one characteristic is at least one of a composition of the gas stream and a flow rate of the gas stream.

16. The system as in claim 10, further comprising a flare gas recovery unit configured for receiving flare gas streams produced in the gas processing plant.

* * * * *